Nov. 21, 1967  J. A. CLEMENS  3,353,776
ARTICULATED TRIPOD HEAD
Filed April 6, 1966  3 Sheets-Sheet 1
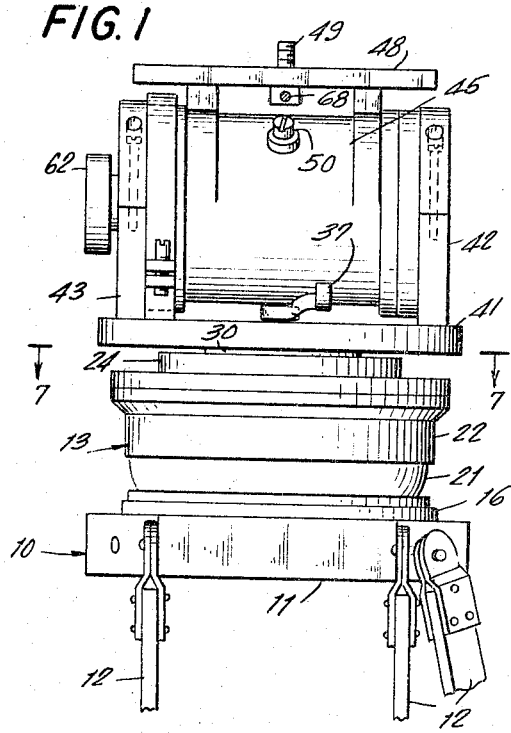
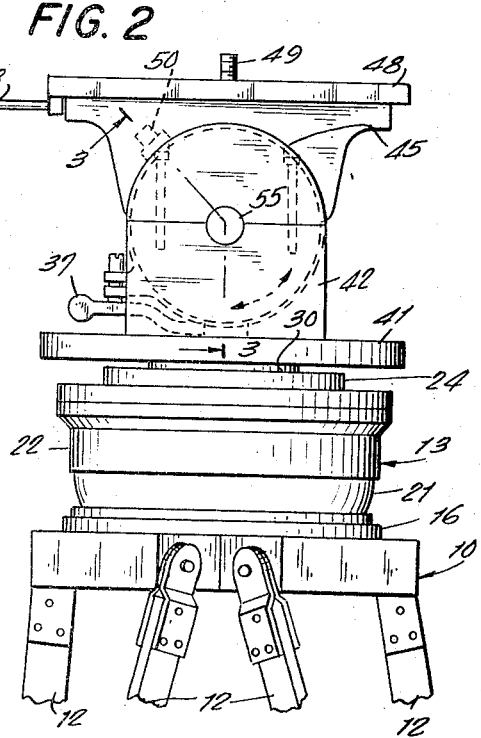
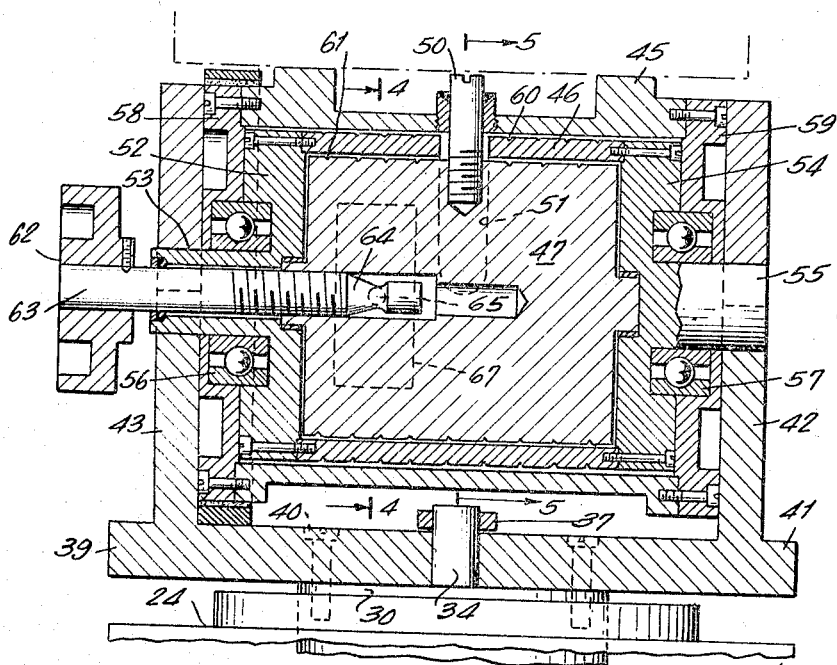
INVENTOR.
JOHN A. CLEMENS
BY
ATTORNEY Nov. 21, 1967  J. A. CLEMENS  3,353,776
ARTICULATED TRIPOD HEAD
Filed April 6, 1966  3 Sheets-Sheet 3

INVENTOR.
JOHN A. CLEMENS
BY
ATTORNEY

United States Patent Office 3,353,776
Patented Nov. 21, 1967

3,353,776
ARTICULATED TRIPOD HEAD
John A. Clemens, Bayside, N.Y., assignor to National Cine Equipment, Inc., New York, N.Y., a corporation of New York
Filed Apr. 6, 1966, Ser. No. 540,618
5 Claims. (Cl. 248—183)

This invention relates to articulated tripod heads and specifically to tripod heads for use in connection with motion picture or television cameras.

In taking motion pictures or in televising scenes, it is important to be able to swing the camera both vertically and horizontally in a smooth continuous manner. This operation, known as panning, must be carried out without any intermittent motion which would be transmitted to the camera and interfere with the quality of the picture. Presently known tripod heads used for this purpose, employ a wide variety of bearings and joints to enable the operator to move the camera as desired. However, previously known devices require a skillful operator in order to avoid sudden jolts or intermittent movements.

Accordingly it is an object of the present invention to provide an articulated tripod head which will permit a camera to be swung in all directions without intermittent motions in the travel.

Another object of the present invention is to provide a tripod head which will remain operative despite wide temperature ranges.

Still another object of the present invention is to provide a tripod head which will give smooth panning effects although employed by relatively unskilled cameramen.

A further object of the present invention is to provide a tripod head which will operate smoothly through a panning sequence and may then be locked rigidly in place as desired.

Another object of the present invention is to provide an articulated tripod head which will be relatively compact.

A feature of the present invention is its use of silicone dampened bearing surfaces to guarantee the smooth movement of the tripod head.

Another feature of the present invention is its use of a double barrel to provide additional bearing surface for the tripod head movement.

Still another feature of the present invention is its cup-shaped bearing surface for tilting the tripod head.

The invention consists of the construction, combination and arrangement of parts, as herein illustrated, described and claimed.

In the accompanying drawings, forming a part hereof there is illustrated one form of embodiment of the invention, in which drawings similar reference characters designate corresponding parts, and which:

FIGURE 1 is a view in front elevation of a complete embodiment of a tripod head, made in accordance with the present invention.

FIGURE 2 is a view in side elevation with certain parts shown in dashed lines of the tripod head shown in FIGURE 1.

FIGURE 3 is a sectional view taken on line 3—3 in FIGURE 2, looking in the direction of the arrows.

Figure 4:
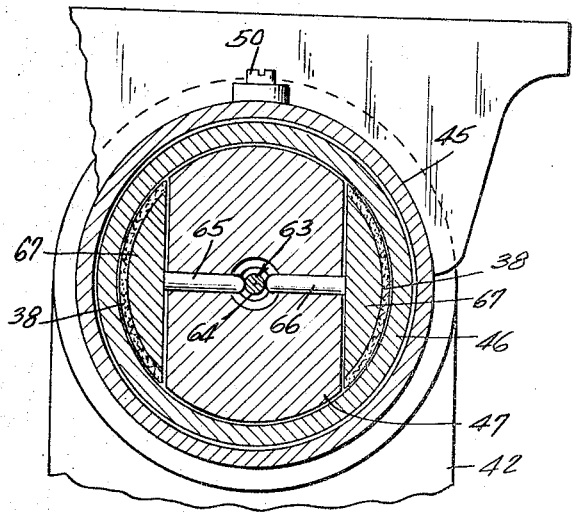
FIGURE 4 is a sectional view taken on line 4—4 in FIGURE 3, looking in the direction of the arrows.
Figure 5:
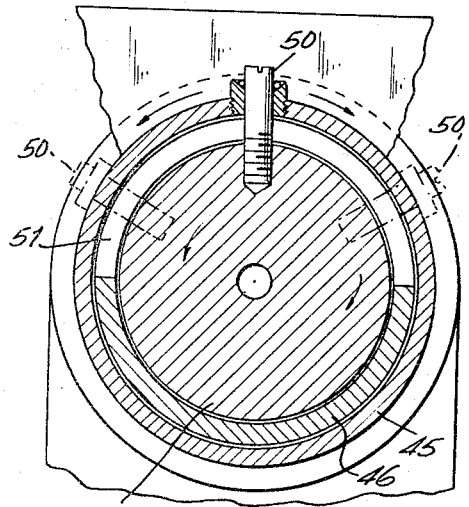
FIGURE 5 is a sectional view taken on line 5—5 in FIGURE 3, looking in the direction of the arrows.

Referring to the drawings, and particularly to FIGURES 1, 2 and 3, 10 indicates a conventional photographic tripod having a top 11, supported by legs 12.

An articulated tripod head 13, is secured to the tripod top 11, by means of the nut 14, which is coupled to the bolt 15, carried by the base 16, of the tripod head 13. The base 16 is substantially ring-shaped, and provided with a bottom wall 17. The wall 17 has an enlarged opening 18 therein, through which the bolt 15 passes. The bottom wall 17 is arcuate in shape and a washer member 19 which overlies the opening 18 is disposed between the tightening nut 14, and the bottom of the wall 17.

The inside of the base 16 is provided with a bearing surface 20, which mates with a hemispheric bearing member 21. By loosening the nut 14 and rotating the hemispheric member 21, within the bearing surfaces of the base 16, a camera may be leveled once the tripod is set up. Thereafter, the tightening nut 14 can be secured to hold the camera in the leveled position. The enlarged opening 18 in the wall 17, permits the hemispheric member 21 to be adjusted.

Figure 7:
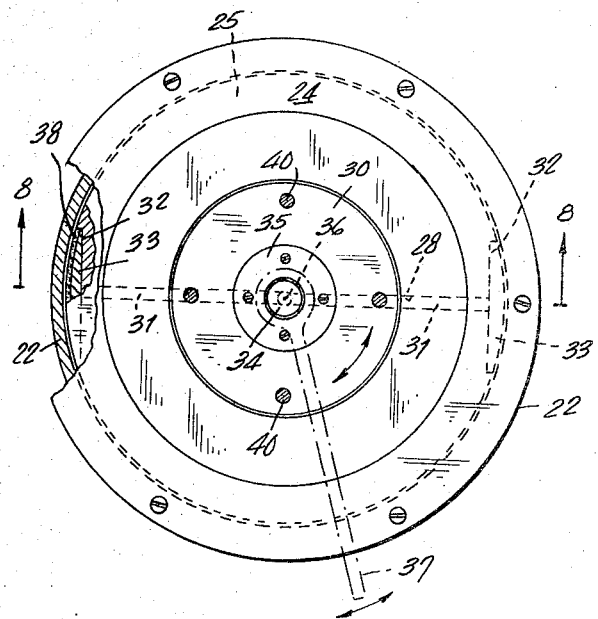
FIGURE 7 is a plan view taken on line 7—7 in FIGURE 1, partly broken away.
Figure 8:
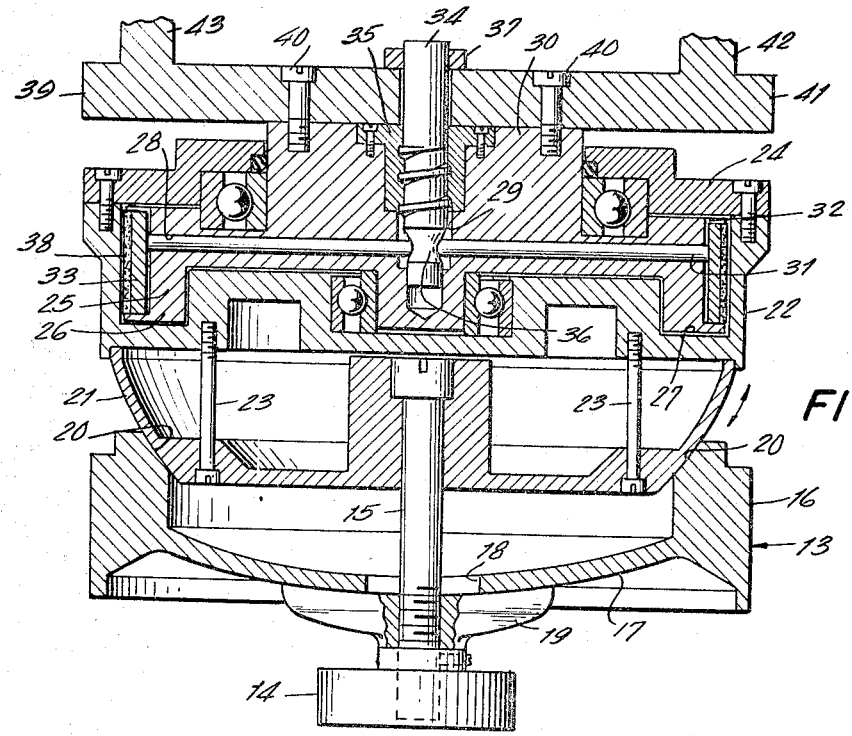
FIGURE 8 is a sectional view taken on line 8—8, in FIGURE 7, looking in the direction of the arrows.

The housing 22 for the "pan" section of the tripod head is secured to the hemispheric leveling member 21 by means of screws 23. The housing 22 is somewhat cup-shaped and provided with a cover member 24. A bearing block 25, best shown in FIGURES 7 and 8, is received within the housing 22. The bearing block is substantially circular in shape with a depending flanged portion 26, at the periphery thereof. The flanged portion 26 extends into a recess 27 within the housing 22. The bearing block 25 fits freely within the housing 22 and the space between the two members is filled with silicone grease. Any rotation imparted to the bearing block 25 as when the tripod head is used for panning, is yieldably resisted by the silicone between the bearing surfaces of the block 25 and the housing 22. The action of the silicone serves to produce a smooth panning action as the tripod head is swung around.

The bearing block 25 is transversely bored as indicated at 28 in FIGURES 7 and 8. A larger vertical bore 29 is also provided in the hub 30 of the bearing block 25 and communicates with the transverse bore 28. A small rod 31 is carried on each side of the vertical bore 29. The bearing block 25 is cut away as indicated at 32 adjacent each end of the transverse bore 28. The cut away portion 32 is adapted to receive therein the brake member 33, which is secured to each end of the rods 31. An elongated worm 34 is threadably received through a bushing 35 carried within the hub 30 of the bearing block 25. The bottom portion of the worm 34 is tapered as indicated at 36 in FIGURE 8, and the ends of the rods 31 ride within the tapered portion 36 of the worm 34. When it is desired to lock the pan section of the tripod head in place, it is merely necessary to rotate the worm 34 by means of the arm 37, best shown in FIGURES 1 and 2. The tapered portion 36 of the worm 34 is thereby forced downwardly pushing the rods 31 outwardly and forcing the brake shoes 38 against the inner wall of the housing 22.

The tilt housing 39 of the tripod head 13 is secured to the hub portion 30 of the bearing block 25 by means of screws 40. The tilt housing 39 consists of a base plate 41 and two spaced upstanding members 42, 43. The upstanding members 42, 43, each comprise two piece support members within which the tilt control mechanism is carried.

Figure 6:
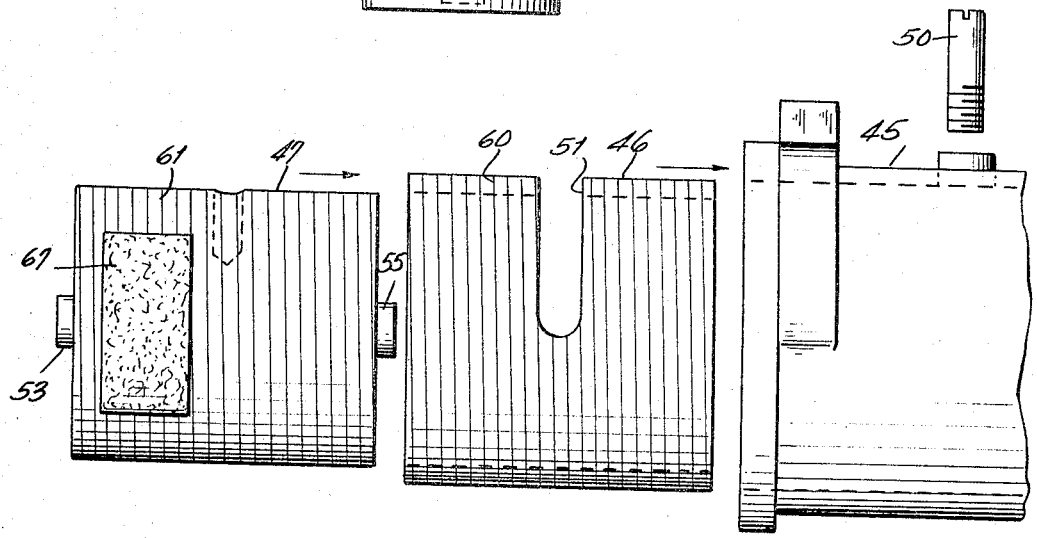
FIGURE 6 is a somewhat exploded view of the control barrel, made in accordance with the present invention.

As best shown in FIGURE 3, the tilt control mechanism 44 consists of an outer barrel 45, an inner barrel 46, and a central barrel member 47. The outer barrel 45 serves to support the table 48, to which the camera (not shown) is secured by means of the screw 49. The outer barrel 45 is secured to the central barrel member 47, by means of a threaded stud 50. The inner barrel 46 is cut away as indicated at 51, in FIGURE 6, to permit the outer barrel and the central barrel to rotate together without disturbing the inner barrel which is fixed.

The inner barrel is attached to a plate 52 (best shown in FIGURE 3) having an elongated hub portion 53 thereon. The hub portion 53 is held between the two members of the upstanding part 43 of the tilt housing 39, in such a manner that it will not rotate. The opposite end of the inner barrel 46 is secured to a second plate member 54. The second plate member 54 has a small stub shaft 55 extending outwardly therefrom which is also held in a fixed position by the upstanding portion 42. Bearing members 56, 57, are carried upon the hub 53 and stub shaft 55. The bearings 56, 57, rotatably support cover members 58, 59, which are secured at each end to the outer barrel 45. The three elements of the tilt mechanism constituting the outer barrel 45, inner barrel 46, and central barrel member 47, are spaced from each other as shown in FIGURE 3. The outer surface of the inner barrel 46, and the outer surface of the central barrel 47, are further provided with helical grooves 60, 61 of a depth of 0.010 inch, and the space between the barrels is filled with silicone grease. As a result, when the tripod head is tilted, the outer barrel 45, and central barrel 47, turn about the surfaces of the inner barrel 46, moving the silicone across an extremely large barrel bearing surface. In this manner, a large amount of resistance is provided within a very compact space. The tilting action of the tripod head is extremely smooth and constant and intermittent motions are dampened out.

When it is desired to lock the tilt mechanism of the tripod head in position, it is merely necessary to turn the handle 62, best shown in FIGURES 1 and 3. The handle 62 is attached to a threaded shaft 63, which is threadably received within the hub 53. A small tapered portion 64 thereby forces two rods 65, 66, slidably carried within the central barrel member 47, apart. The rods 65, 66, are attached to brake members 67 at each end thereof which in turn are forced against the inner surface of the inner barrel 46. The central barrel member 47 is cut away as shown in FIGURES 3 and 4 to accommodate the brake members 67.

Figure 9:
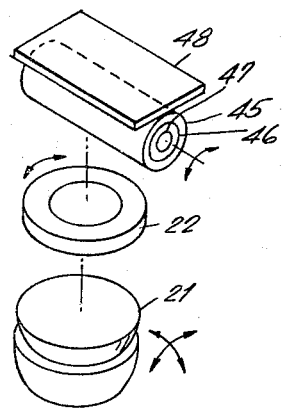
FIGURE 9 is a somewhat diagrammatic view on a reduced scale of the elements of the tripod head shown in a somewhat exploded relationship.

Referring to FIGURE 9, it will be seen that every possible motion which may be desired by the camera operator may be achieved by means of the tripod head hereinabove described. The use of the silicone filled spaces between the bearing surfaces and the helical grooves to increase the bearing surface, together with the three part barrel assembly, provides an extremely smooth well dampened motion to the tripod head as it is operated. Sudden forces applied to the tripod head are resisted by these elements with the result that the pictures taken are free from jolts and undesired movements as pressure is applied to the control handle 68.

Having thus fully described the invention, what is claimed as new and desired to be secured by Letters Patent of the United States is:

1. An articulated tripod head comprising a base, a hemispheric leveling member tiltably carried upon the base, a cup-shaped housing secured to the leveling member, a bearing block freely carried within the cup-shaped housing, a quantity of silicone grease between the bearing block and cup-shaped housing to yieldably resist relative motion between the said block and housing, a tilt housing secured to the bearing block, an outer barrel axially and rotatably supported by the tilt housing, an inner barrel within the outer barrel fixedly supported by the tilt housing, a central barrel within the inner barrel coupled to the outer barrel for rotation with said outer barrel, a quantity of silicone grease between the adjacent surfaces of the outer barrel, the inner barrel, and the central barrel whereby relative motion between the outer barrel, the central barrel and the inner barrel is yieldably resisted and brake means for the said barrels.

2. A device according to claim 1, in which the adjacent barrel surfaces are grooved, to a depth of 0.010 inch.

3. A device according to claim 1, in which the bearing block is vertically and transversely bored, an elongated rod member is carried within the bore on each side of the transverse bore, a brake block is secured to the outer ends of the said rods and an elongated worm is threadably carried within the vertical bore in contact with the inner ends of the rods whereby movement of the worm in the direction of the rods will force the brake blocks against the cup-shaped housing to lock the said housing and bearing block together.

4. A device according to claim 1, in which the central barrel is axially and transversely bored, said bores communicating with each other, an elongated rod is carried within the transverse bore on each side of the axial bore, a brake block is secured to the outer ends of the said rods and an elongated worm is threadably carried within the axial bore in contact with the inner ends of the rods whereby movement of the worm in the direction of the rods will force the brake blocks against the fixed inner barrel to lock the said barrels together.

5. A device according to claim 4, in which the end of the worm adjacent the rods is tapered in the direction of the rods.

References Cited

UNITED STATES PATENTS

| 2,882,001 | 4/1959 | Ries et al. | 248—183 |
| 2,957,365 | 10/1960 | Sachtler | 95—86 XR |
| 2,962,251 | 11/1960 | Karpf | 95—86 XR |
| 3,180,603 | 4/1965 | O'Connor | 248—183 |
| 3,211,405 | 10/1965 | Fey et al. | 248—183 |

JOHN PETO, *Primary Examiner.*

J. FRANKLIN FOSS, *Assistant Examiner.*